F. P. McCOLL.
CAN CARRIER FOR SOLDERING MACHINES.
APPLICATION FILED JULY 20, 1908.

1,159,513.

Patented Nov. 9, 1915.

Witnesses:
Harry S. Gaither
Ruby V. Nash

Inventor
Francis P. McColl
by Walter H. Chamberlin
Atty

UNITED STATES PATENT OFFICE.

FRANCIS P. McCOLL, OF EASTPORT, MAINE, ASSIGNOR TO AMERICAN KEY CAN COMPANY, OF CHICAGO, ILLINOIS, A CORPORATION OF NEW JERSEY.

CAN-CARRIER FOR SOLDERING-MACHINES.

1,159,513. Specification of Letters Patent. Patented Nov. 9, 1915.

Application filed July 20, 1908. Serial No. 444,306.

*To all whom it may concern:*

Be it known that I, FRANCIS P. McCOLL, a citizen of the United States, residing at Eastport, county of Washington, State of Maine, have invented a certain new and useful Improvement in Can-Carriers for Soldering-Machines, and declare the following to be a full, clear, and exact description of the same, such as will enable others skilled in the art to which it pertains to make and use the same, reference being had to the accompanying drawings, which form a part of this specification.

My invention relates to the art of soldering cans or the like and more particularly to a device for supporting the can or other article during the soldering operation.

In the manufacture of certain types of cans it is customary to place a cover and a decorated can body in the proper relation to each other in a holder of some sort and then to carry the holder over a gas jet or flame which gives an intense heat; the holder being so arranged that the heat may reach the parts bearing the solder so as to fuse the solder and cause the cover and the body to be joined together. In present types of holders or carriers the flame very often comes into contact with the decorated walls of the can body and discolors or even destroys a part of the decorations.

One of the objects of the present invention is to provide a holder or carrier wherein a joint in a can or the like may be effectively soldered without danger of injuring the decorations or printing upon the can body.

A further object of the present invention is to so construct and arrange a carrier of the type preferred to that the heat will be concentrated evenly along the joint to be treated, thereby decreasing the time required for the soldering operation and making it possible to increase the capacity of a given size of machine as well as reducing the amount of solder used.

A further object of my invention is to provide a device of the character described which shall reduce the amount of gas or other fuel consumed to a minimum.

Figure 1:
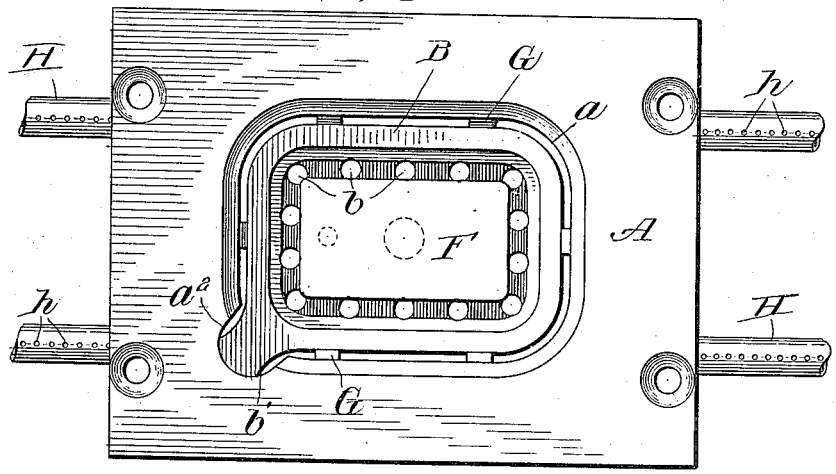
Figure 2:
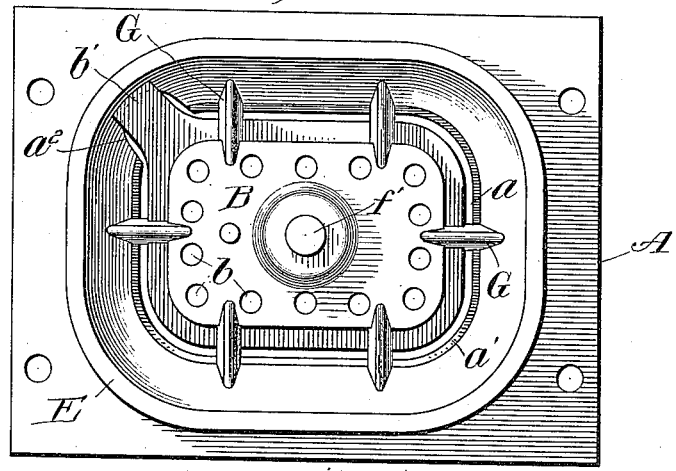
Figure 3:
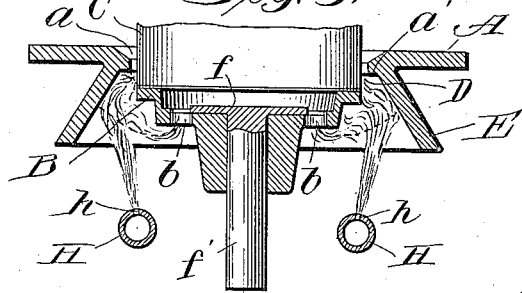

The various features of novelty whereby my invention is characterized will be hereinafter pointed out with particularity in the claim, but for a full understanding of my invention and of its various objects and advantages reference may be had to the following detailed description taken in connection with the accompanying drawing; wherein:

Figure 1 is a top plan view of my improved carrier, showing its relation to the usual gas pipe heaters; Fig. 2 is a bottom plan view of the carrier; and Fig. 3 is a central transverse section through the carrier and gas pipes, a portion of a can supported in the carrier being shown in side elevation.

Since my invention has to do particularly with a holder or carrier for a can I have omitted all of the other parts of the machine of which this holder or carrier forms a part except a portion of the gas pipes, for my invention is not limited to any particular type of machine but may be employed in any machine wherein it is desired to have a holder or carrier for bringing a can into operative relation to a heating device.

Referring to the drawings, A represents a frame member having a central opening $a$ of the same shape and slightly larger than the cross section of the cans which are to be operated upon.

B is a can supporting platform arranged to register with the opening in the frame member and preferably located slightly below the frame member so that when a can C is resting upon the platform a narrow strip of the can body along the lower edge is exposed. Viewed in another aspect the platform and the frame are separated from each other by means of a passage-way D. The platform may be of substantially the same size and shape as the bottom of the can. The platform is preferably provided with a number of perforations $b$. Surrounding the platform is an outwardly flaring annular flange or deflector E the upper end of which is connected with the frame member and preferably at a short distance outside of the opening $a$ so as to form a horizontal inwardly projecting annular lip or flange $a'$ adjacent to the upper end of the deflector. I have also shown an ejector F comprising a head $f$ lying upon the top of the platform beneath the can and a stem $f'$ projecting through the platform, this ejector forming, however, no part of the present invention.

The frame, the platform, and the deflector may conveniently be made in the form of a single casting, the deflector being joined directly to the underside of the frame and the platform being connected to the deflector and the frame by means of supporting arms or webs G cast integrally with the remaining parts.

The carrier illustrated is one adapted to hold a common form of roll top in operative relation to the can body and therefore the frame is provided with a branch opening $a^2$ leading from one corner of the main opening $a$ and the platform is provided with a shelf $b'$ which lies beneath the opening $a^2$. The lip upon the top which is adapted to be inserted into the usual key is intended to rest upon the shelf $b'$.

H, H are a pair of gas pipes provided with perforations $h$ and located directly below the path of movement of the carrier. These pipes are preferably so arranged that they lie within the lower edges of the side walls of the deflector so that the upwardly shooting flames strike against the inner faces of the side walls and are deflected laterally into the passage D and against the narrow strip about the lower edge of the can. The flame is not only deflected by the side walls but is carried around inside the end walls of the deflector so as to be concentrated along the entire exposed strip. Furthermore a portion of the flame will back up and pass through the openings $b$ in the platform thereby heating the cover of the can from beneath.

I have found that decorated cans which are soldered while supported in my improved carrier pass through the soldering operation with the decorations entirely unaffected while of the same type of cans supported in the most improved prior form of holders many had their decorations burned or discolored. Furthermore by reason of the concentration of the heat directly at the joint the time required to effect the soldering and the amount of gas used have been cut in two. By making the carrier travel at the same rate as in former machines it is possible, therefore, to reduce the size of the machines one half because the soldering is effected while the can is traveling through half the distance previously required; or, if the size of the machine is not reduced, its capacity will be doubled or at least greatly increased.

While I have described in detail a single preferred form of my invention I do not desire to be limited to this particular form for, in its broader aspects, my invention may take various other forms as will be evident from the terms employed in the definitions of my invention constituting the appended claim.

Having now fully described my invention, what I claim as new and desire to secure by Letters Patent is:

In a soldering machine, one or more elongated burners, a carrier for a can to be soldered adapted to be moved along the burner or burners above and in proximity to the same, said carrier having a seat for supporting the can and a narrow annular passage extending through the same around the seat, said passage being of substantially the same size and shape as the end of a can to be soldered, and means on the under side of the carrier for deflecting the flame from the burner or burners in a continuous annular sheet through said passage.

In testimony whereof, I sign this specification in the presence of two witnesses.

FRANCIS P. McCOLL.

Witnesses:
 FLORENCE E. SMALL,
 N. A. HAYCOCK.

Copies of this patent may be obtained for five cents each, by addressing the "Commissioner of Patents, Washington, D. C."